United States Patent [19]

Borchardt et al.

[11] Patent Number: 4,536,305
[45] Date of Patent: Aug. 20, 1985

[54] METHODS FOR STABILIZING SWELLING CLAYS OR MIGRATING FINES IN SUBTERRANEAN FORMATIONS

[75] Inventors: John K. Borchardt; Bill M. Young, both of Duncan, Okla.

[73] Assignee: Halliburton Company, Duncan, Okla.

[21] Appl. No.: 653,668

[22] Filed: Sep. 21, 1984

[51] Int. Cl.$^3$ ...................... E21B 43/12; E21B 43/25
[52] U.S. Cl. .............................. 252/8.55 R; 166/275; 166/307; 166/305.1; 252/8.55 C; 252/8.55 D; 405/264
[58] Field of Search ..................... 252/8.55 R, 8.55 C, 252/8.55 D; 166/275, 305 R, 307; 405/264

[56] References Cited

U.S. PATENT DOCUMENTS

| | | |
|---|---|---|
| 3,057,798 | 10/1962 | Knox . |
| 3,349,032 | 10/1967 | Krieg . |
| 3,434,971 | 3/1969 | Atkins . |
| 3,494,865 | 2/1970 | Andrews et al. . |
| 3,562,226 | 2/1971 | Gayley et al. . |
| 3,704,750 | 12/1972 | Miles et al. . |
| 3,794,117 | 2/1974 | Knox et al. . |
| 3,827,977 | 8/1974 | Miles et al. . |
| 3,832,302 | 8/1974 | Lansford et al. . |
| 3,868,328 | 2/1975 | Booth et al. . |
| 3,916,994 | 11/1975 | Maddox, Jr. et al. . |
| 3,916,995 | 11/1975 | Shupe et al. . |
| 3,916,996 | 11/1975 | Shupe et al. . |
| 3,927,718 | 12/1975 | Tate et al. . |
| 3,943,060 | 3/1976 | Martin et al. . |
| 3,962,332 | 6/1976 | Trapasso . |
| 4,055,502 | 10/1977 | Swanson . |
| 4,062,796 | 12/1977 | Gardner et al. . |
| 4,079,011 | 3/1978 | Tate . |
| 4,152,274 | 5/1979 | Phillips et al. . |
| 4,158,521 | 6/1979 | Anderson et al. . |
| 4,200,151 | 4/1980 | Tate . |
| 4,200,154 | 4/1980 | Tate . |
| 4,206,058 | 6/1980 | Tate . |
| 4,360,483 | 11/1982 | Ayres . |
| 4,366,071 | 12/1982 | McLaughlin et al. . |
| 4,366,072 | 12/1982 | McLaughlin et al. . |
| 4,366,073 | 12/1982 | McLaughlin et al. . |
| 4,366,074 | 12/1982 | McLaughlin et al. . |
| 4,374,739 | 2/1983 | McLaughlin et al. . |
| 4,393,939 | 7/1983 | Smith et al. . |
| 4,447,342 | 5/1984 | Borchardt et al. . |
| 4,460,483 | 7/1984 | Weaver . |
| 4,462,718 | 7/1984 | McLaughlin et al. . |
| 4,497,596 | 2/1985 | Borchardt et al. ............ 252/8.55 X |

*Primary Examiner*—Herbert B. Guynn
*Attorney, Agent, or Firm*—Thomas R. Weaver; Edward F. Sherer

[57] ABSTRACT

A method of treating an earthen formation containing swelling clays or migrating fines or combinations thereof to reduce the loss of permeability in said formation. The method is carried out by contacting the swelling clays or fines with an effective amount of an organic polycationic polymer which contains three quaternary ammonium moieties in the monomer repeat unit.

19 Claims, No Drawings

METHODS FOR STABILIZING SWELLING CLAYS OR MIGRATING FINES IN SUBTERRANEAN FORMATIONS

BACKGROUND AND SUMMARY OF THE INVENTION

This invention relates to a method of treating a permeable structure such as a permeable subterranean formation using water-soluble organic polycationic polymers containing three quaternary ammonium moieties in the monomer repeat units in order to stabilize in the structure migrating fines such as silicate, iron minerals, and alkaline earth metal carbonates or swelling clays or combinations thereof.

The recovery of fluids such as oil or gas has been troublesome in areas where a subterranean formation is composed of one or more layers or zones which contain swelling clays such as clays in the smectic group including clay materials such as montmorillonite, beidellite, nontromite, saponite, hectorite, and sauconite or migrating fines such as silica, iron minerals and alkaline earth metal carbonates. At times during the recovery of formation fluids from the particular layers or zones of the formation, the clays swell or the fines migrate to the wellbore and block the passageways leading to the wellbore. This swelling or migration is often a particular problem when swelling clays or migrating fines are contacted with water foreign to the formation. Plugging or materially impairing the flow of the formation fluids towards the wellbore results in a loss of these fluids to the producer or so decreases the rate of hydrocarbon recovery from the well as to cause the well to be shut down because it is economically unattractive to produce therefrom. An additional adverse factor resulting from the movement of fines towards the wellbore is that the fines are often carried along with the formation fluids to the wellbore and pass through pipes, pumps, etc., being used to recover the formation fluids to the surface with resulting damage to the moving parts as the fines are very abrasive.

Secondary and tertiary methods of recovering hydrocarbons from a subterranean formation are well known. In general, such a method involves introducing a fluid, such as water, steam, etc., into one or more injection wells which penetrate the formation and forcing the fluid toward one or more of said producing wells. Swelling clays or migrating fines or combinations thereof during such an operation can cause a decrease in the rate in which fluid can be injected into the formation and can decrease the permeability or porosity of the formation which results in a decrease in the rate of hydrocarbon production at the offset production wells.

Swelling clays or migrating fines or combinations thereof are frequently encountered during acidizing or fracturing operations and during sand consolidation operations. The presence of the clays or migrating fines or combinations thereof during these operations can result in a decrease in the permeability of the formation which is being treated.

Gravel packing is a widely practiced method of preventing the production of sand from poorly consolidated formations. The swelling of the clays or the migration of fines or combinations thereof into the gravel pack can greatly reduce the permeability of the gravel pack. This can result in a decrease in the rate of production of hydrocarbons from the formation.

Numerous attempts have been made heretofore to control the ill effects of water on swelling clays or migrating fines or combinations thereof in subterranean formations. For example, treating solutions containing cations such as potassium, calcium, ammonium, and hydrogen ions have been introduced into clay-containing subterranean formations whereby the clays are contacted thereby. Ions contained in the clays are replaced by ions in the solutions thereby transforming the clays into relatively non-swelling forms. While success has been achieved with this method, the exchanging of the other ions for ions in the clays is only a temporary remedy in that counter-replacement can readily take place.

In order to make the replacement of ions in the clays more permanent, inorganic polycationic polymers or complexes have been utilized in lieu of simple cations. Such inorganic polycationic polymers or complexes have been successful in controlling swelling clays but have their various limitations. For example, the most commonly used inorganic polycationic polymers are zirconyl chloride ($ZrOCl_2$) and aluminum hydroxy chloride ($Al(OH)_xCl_y$). Aluminum hydroxy chloride requires a cure time after it is placed in the presence of the clay which is disadvantageous in that rig and production times are consumed during the wait. Also, aluminum hydroxy chloride can tolerate only a limited amount of carbonate material in the formation and is removed by contact with acids such as when a subsequent acid treatment of the formation is necessary. Zirconyl chloride is limited in the pH range of the placement fluid and can be removed by acid under certain conditions.

Organic polycationic polymers have also been utilized for stabilizing clays or migrating fines or combinations thereof. For instance, U.S. Pat. Nos. 4,366,071; 4,366,072; 4,366,073; 4,366,074; 4,374,739; 4,360,483; 4,460,483; and 4,462,718 disclose the use of organic polycationic polymers to prevent or reduce the ill effects of swelling clays or migrating fines or combinations thereof in subterranean formations. These patents are assigned to the assignee of the present invention and are hereby incorporated by reference.

U.S. Pat. Application Ser. No. 478,573 filed Mar. 24, 1983, now U.S. Pat. No. 4,497,596, by John K. Borchardt and Bill M. Young discloses and claims a method of treating a permeable subterranean formation using water-soluble organic polycationic polymers containing two quaternary ammonium moieties in the polymer repeat units in order to stabilize in the formation migrating fines in presence or absence of swelling clays. This patent application is assigned to the assignee of the present invention and is hereby incorporated by reference.

The present invention is a method of preventing or reducing the migration of fines or the swelling of clays or combinations thereof within a permeable structure such as a subterranean formation by contacting the swelling clays or migrating fines or combinations thereof in the permeable structure with an effective amount of organic polycationic polymers containing three quaternary ammonium moieties in the monomer repeat units.

The organic polycationic polymers used in the method of the invention are very effective in treating swelling clays such as clays in the smectic group including clay minerals such as montmorillonite, beidellite, nontromite, saponite, hectorite and sauconite and fines such as silica, iron minerals such as hematite, magnetite, lepidocrocite, wuestite, akaganeite and siderite, and alkaline earth metal carbonates such as calcite and dolomite. The organic polycationic polymers are particularly effective when used in conjunction with acidizing operations that utilize strong mineral acids such as 15% by weight hydrochloric acid or mixtures of 3% by weight hydrofluoric acid and 12% by weight hydrochloric acid. Furthermore, the organic cationic polymers are very effective over a wide range of temperatures and particularly effective from about 90° F. to about 200° F. A treatment with the organic polycationic polymers of the present invention is essentially permanent and the polymers are very resistant to being removed by brines, oils and acids. Permeable structures, such as subterranean formations, exhibit high permeability retention after the structure has been treated with the organic polycationic polymers. No well shut-in time is required when the organic polycationic polymers are used to carry out the method of the invention.

DETAILED DESCRIPTION OF THE INVENTION

The present invention involves the use of organic polycationic copolymers containing three quaternary ammonium moieties in the polymer repeat units to prevent or reduce the migration of fines or the swelling of clays or combinations thereof contained in a permeable structure such as a subterranean formation. The use of the method of the invention results in stabilizing the clays or fines contained in the permeable structure. The method is carried out by contacting the migrating fines or swelling clays or combinations thereof with an effective amount of an organic polycationic polymer having a molecular weight in the range of from about 50,000 to about 300,000 and having monomer units of the formula:

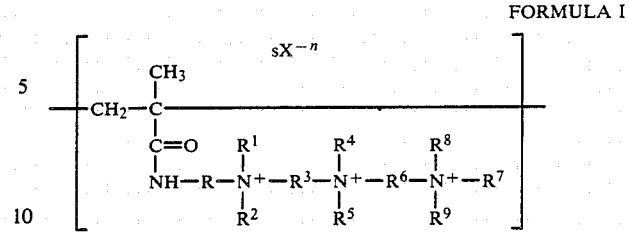

FORMULA I wherein

R and $R^3$ are independently selected from the group consisting of an alkylene group having from about 2 to about 4 carbon atoms;

$R^1$, $R^2$, $R^4$, $R^5$, $R^7$, $R^8$, and $R^9$ are independently selected from the group consisting of methyl and ethyl;

$R^6$ is selected from the group consisting of an unsubstituted alkylene group having from about 2 to 4 carbon atoms and a substituted alkylene group having from about 2 to about 4 carbon atoms and containing a hydroxy group;

X is an anion selected from the group consisting of a halogen, methyl sulfate, sulfate, and nitrate;

n represents the valency of the anion represented by X; and, s is an integer equal to the number of said anions required to maintain electronic neutrality.

In Formula I, R and $R^3$ are preferably independently selected from the group consisting of ethylene, trimethylene, tetramethylene, and 2-methyltrimethylene; $R^6$ is preferably selected from the group consisting of 2-hydroxytrimethylene, 2-hydroxytetramethylene, and 3-hydroxytetramethlene; $R^1$ and $R^2$ are preferably methyl; $R^4$ and $R^5$ are preferably ethyl; $R^7$, $R^8$ and $R^9$ are preferably methyl; and X is preferably selected from the group consisting of a halogen such as chloride, bromide, and iodide, methyl sulfate and sulfate. Examples of monomers of Formula I are shown in Table I:

TABLE I

| Monomer Unit | R | $R^1$ | $R^2$ | $R^3$ | $R^4$ | $R^5$ |
|---|---|---|---|---|---|---|
| A. | $CH_2CH_2$ | $CH_3$ | $CH_3$ | $CH_2CH_2$ | $CH_2CH_3$ | $CH_2CH_3$ |
| B. | $CH_2CH_2CH_2$ | $CH_2CH_3$ | $CH_2CH_3$ | $CH_2CH_2CH_2$ | $CH_2CH_3$ | $CH_2CH_3$ |
| C. | $CH_2CH_2$ | $CH_3$ | $CH_3$ | $CH_2CH_2$ | $CH_3$ | $CH_3$ |
| D. | $CH_2CH_2$ | $CH_3$ | $CH_3$ | $CH_2CH_2$ | $CH_2CH_3$ | $CH_2CH_3$ |
| E. | $CH_2CH_2$ | $CH_3$ | $CH_3$ | $CH_2CH_2$ | $CH_2CH_3$ | $CH_2CH_3$ |
| F. | $CH_3$ \| $CH_2CH_2CH_2$ | $CH_3$ | $CH_3$ | $CH_2CH_2$ | $CH_2CH_3$ | $CH_2CH_3$ |
| G. | $CH_3$ \| $CH_2CHCH_2$ | $CH_3$ | $CH_3$ | $CH_2CH_2$ | $CH_3$ | $CH_3$ |

| Monomer Unit | $R^6$ | $R^7$ | $R^8$ | $R^9$ | X |
|---|---|---|---|---|---|
| A. | OH \| $CH_2CHCH_2$ | $CH_3$ | $CH_3$ | $CH_3$ | Cl |
| B. | OH \| $CH_2CHCH_2CH_2$ | $CH_2CH_3$ | $CH_2CH_3$ | $CH_2CH_3$ | Cl |
| C. | OH \| $CH_2CHCH_2$ | $CH_3$ | $CH_3$ | $CH_3$ | Cl |
| D. | OH \| $CH_2CHCH_2$ | $CH_3$ | $CH_3$ | $CH_3$ | $CH_3SO_4$ |

TABLE I-continued

| | | | | | |
|---|---|---|---|---|---|
| E. | OH<br>\|<br>CH$_2$CHCH$_2$ | CH$_3$ | CH$_3$ | CH$_3$ | SO$_4$ |
| F. | OH<br>\|<br>CH$_2$CHCH$_2$ | CH$_3$ | CH$_3$ | CH$_3$ | Cl |
| G. | OH<br>\|<br>CH$_2$CHCH$_2$CH$_2$ | CH$_3$ | CH$_3$ | CH$_3$ | Cl |

The monomer units shown in Table I are merely illustrative of the monomer units of the organic polycationic polymers which are suitable for use in the method of the present invention and other examples will be readily apparent to a person of ordinary skill in the art.

The preferred organic polycationic polymer for use in the present invention is shown in Table I as monomer unit A. Polymers containing this monomer unit are known as poly(methacrylamido-4,7,11-triaza-4,4,7,7,11,11-hexamethyl-9-hydroxydodecamethylene trichloride) (PMTHHDT). In PMTHHDT, $R^1$, $R^2$, $R^7$, $R^8$ and $R^9$ are methyl, R is ethylene, $R^4$ and $R^5$ are ethyl, $R^6$ is 2-hydroxytrimethylene and X is chloride.

Although the present invention utilizes organic polycationic polymers containing three quaternary ammonium moieties in the side chain of the monomer units, it is possible that additional quaternary ammonium moieties can be attached to the side chain of the monomer units. For example, it is contemplated that the organic polycationic polymers used in the method of the present invention could contain at least one to three additional quaternary ammonium moieties in the side chain of the monomer units. Due to the present high cost and unavailability of these organic polycationic polymers, it is not currently feasible to use these organic polycationic polymers to carry out the method of the present invention.

Although the invention is not to be limited to any particular theory of operation, it is believed that the organic polycationic polymers are particularly effective in preventing or reducing the migration of fines or the swelling of clays because the three quaternary ammonium moieties are in close proximity to one another and therefore give the organic polycationic polymers a high charge density which is positive. The high charge density appears to produce a greater adherence of the organic polycationic polymers to the negatively charged sites on the clays or fine particles. This in turn causes the organic polycationic polymers to be more resistant to removal by fluids flowing over the polymers and therefore it is believed that for this reason the polymers are more effective at high temperatures and at strongly acidic environments.

The organic polycationic polymers of the present invention should have a molecular weight of from about 50,000 to about 300,000. Preferably the organic polycationic polymers have a weight average molecular weight of about 135,000. The molecular weight of the organic polycationic polymers used in the method of the present invention will vary over a wide range depending upon the permeability of the formation to be treated.

Methods or preparing the organic polycationic polymers used in the method of the present invention are known in the art. One method of preparing a polymer containing PMTHHDT monomer units comprises condensing in an aqueous solution N,N-dimethylaminopropyl methacrylamide with the hydrochloride salt of 2-chloro-N,N-diethylaminoethane to form an intermediate product and subsequently reacting in an aqueous solution the intermediate product with 1,2-epoxy-3-propyltrimethylammonium chloride to form PMTHHDT monomer units. The monomer units can then by polymerized by a free radical initiator to form the polymer.

The organic polycationic polymers used in the method of the present invention may also contain, in addition to the previously described monomer units containing three quaternary ammonium moieties in the polymer repeat unit, monomeric units such as dimethylaminoethyl methacrylate, the alkyl chloride salts of dimethylaminoethyl methacrylate, N,N-dimethylacrylamide, N-hydroxymethylacrylamide, diethylaminomethyl methacrylate, and N,N-dimethylaminopropyl methacrylamide. These monomeric units may be present in the polymer in an amount of up to 30% by weight of the polymer.

The organic polycationic polymers of the present invention can be used to treat natural and artificial structures which are permeable, including poorly consolidated and unconsolidated rocks. The method of the invention is particularly suited for stabilizing clay and fine particles having a diameter of less than 10 microns. Furthermore, there is a wide range of application for the organic polycationic polymers. These applications involve using the organic polycationic polymers alone, as the primary treating agent, or as an auxiliary in other treatments.

The amount of organic polycationic polymer employed in the method of the present invention will vary according to, for example, the size and porosity of the particular formation and the types of fines present. Therefore, there are no upper or lower limits in this regard.

Any suitable method of application can be used to carry out the method of the invention. For some applications such as surface or exposed structures, it may be desirable to merely spray the polymer onto the permeable mass. The essential feature is contact between the fines to be treated and the organic polycationic polymer.

When a carrier fluid is used to carry out the method of the invention, the organic polycationic polymers will be generally present in the carrier fluid in a concentrations within the range of from about 0.01% to about 5.0% by weight of the carrier fluid. Lower or higher concentrations can be used, but are not generally as practical. When a carrier fluid is used, the preferred concentration of the organic polycationic polymers will be in the range of from about 0.25% to about 1.0% by weight of the carrier fluid.

Carrier fluids which can be used to carry out the method of the present invention include polar and nonpolar fluids. Examples of suitable fluids include water, brine, aqueous mixtures of low molecular weight alcohols, ketones, and monoethers of glycol. Examples of suitable low molecular weight alcohols include methanol, ethanol, and isopropanol. When water is used as the carrier fluid, the carrier fluid can contain other ingredients which do not substantially interfere with the dispersion or dissolution or the organic polycationic polymer in the carrier fluid.

Furthermore, the carrier fluid can be gelled or thickened for certain applications. Examples of ingredients which can be included in the water includes salts, mineral acids such as hydrochloric acid or hydrofluoric acid or mixtures thereof, low molecular weight organic acids, cationic or nonionic surfactants, and wetting agents. Preferably the carrier fluid has a viscosity of less than 10 centipoises. Higher viscosity fluids may be used in certain applications but are not generally very practical due to the pressure in pumping requirements. A preferred aqueous carrier fluid is a saline solution containing about 0.1 to about 40.0% by weight of salt. The preferred salt concentration is about 2 to about 12% by weight of the solution. The salt can be an alkali metal salt, an alkaline earth metal salt, an ammonium salt or mixtures thereof. Suitable anions include halides, such as chloride, bromide, iodide, and fluoride, sulfates, carbonates, hydroxides, or mixtures thereof. The halides of potassium, sodium, magnesium, calcium, and ammonium and mixtures thereof are preferred due to the economics and solubility. Aqueous acids having a concentration in the range of about 0.1 to about 40.0% by weight of the solution can also be utilized in carrying out the method of the invention. Examples of suitable acids include hydrochloric acid, hydrofluoric acid, phosphoric acid, acetic acid, formic acid, citric acid, and mixtures thereof. The preferred acids include about 3 to about 15% by weight of hydrochloric acid and a mixture of about 3% by weight of hydrofluoric acid and about 12% by weight of hydrochloric acid.

The method of the present invention can be used in a number of operations. For example, the method of the present invention can be used in conjunction with sand consolidation procedures, gravel packing procedures, secondary recovery operations, and acidizing or fracturing operations. In these operations, the organic polycationic polymers can be used to prevent or reduce the amount of swelling of clays or migration of fines or combinations thereof in the subterranean formation. This results in a greater permeability in the formation and a greater permeability increase during acidizing or fracturing operations.

The present invention is further exemplified by the examples which are presented to illustrate certain specific embodiments of this invention, but are not intended to be construed so as to be restrictive of the spirit and scope thereof.

EXAMPLE I

Tests were performed to evaluate the organic polycationic polymers of the present invention as fine stabilizers. The polymer used to carry out these tests comprised poly(methacrylamido-4,7,11-triaza-4,4,7,7,11,11-hexamethyl-9-hydroxydodecamethylene trichloride) (PMTHHDT). The PMTHHDT had a weight average molecular weight of about 135,000.

The test equipment used in the tests comprised a TEFLON sleeved test chamber having a diameter of about 2.5 cm at the bottom of the chamber and a diameter of about 2.6 cm at the top of the chamber. The chamber design insured that, under modest applied pressure, fluid injected during the test would flow through the test sand rather that around the test sand. The test sand comprised 100 grams of a mixture of 85 percent by weight 70–170 U.S. mesh sand and 15 percent by weight of either hematite, calcite, or silica fine particles. The silica fine particles had a median particle diameter of 22.4 microns and a surface area of 1.20 $m^2$ gram. The hematite fine particles had a median article diameter of 4.4 microns and a surface area of 6.44 $m^2/gram$. The calcite fine particles had a median particle diameter of 8.9 microns and a surface area of 10.98 $m^2/gram$. A 100 U.S. mesh screen was placed at the base of the chamber to hold the larger particles in place.

The test chamber and fluid reservoir were heated to about 145° F. The first fluid injected into the top of the chamber during the test comprised 236 cc of an aqueous solution containing 2 percent by weight of ammonium chloride and either 0.45 or 0.23 percent by weight PMTHHDT. The fluid containing 0.45 percent by weight PMTHHDT had a viscosity of 1.53 centipoises at 74° F. using a Brookfield Model LVT viscometer, UL adapter at 30 rpm. The injection pressure was 5 psia.

Included in these tests were treatments in which no PMTHHDT was added to the first fluid. After completion of the injection of the first fluid, the injection pressure was increased to 40 psig and 500 cc of fresh water was injected. The fresh water treatment was optionally followed by an injection at 40 psig of 400 cc of an aqueous fluid comprising 15 percent by weight of hydrochloric acid and an injection at 40 psig of 500 cc of fresh water.

The effluent of each treatment was collected and filtered through a tared piece of 0.45 micron filter paper. The solids from the effluent were collected in filter paper, dried and weighed. The results of these tests are shown in Table II.

TABLE II

| Test No. | Copolymer Used (% by weight) | Fines Tested | Fines Production 500 cc Fresh H$_2$O (g) | 400 cc 15% HCl (g) | 500 cc Fresh H$_2$O (g) | Fines Produced Total (g) |
|---|---|---|---|---|---|---|
| 1. | none | Silica | 0.21 | 0.05 | 0.08 | 0.34 |
| 2. | PMTHHDT (0.45) | Silica | 0.03 | 0.01 | 0.01 | 0.05 |
| 3. | PMTHHDT (0.45) | Silica | 0.03 | 0.02 | 0.02 | 0.07 |
| 4. | none | Hematite | 0.18 | — | — | 0.18 |
| 5. | PMTHHDT (0.45) | Hematite | 0.12 | — | — | 0.12 |
| 6. | PMTHHDT | Hematite | 0.16 | — | — | 0.16 |

TABLE II-continued

| Test No. | Copolymer Used (% by weight) | Fines Tested | Fines Production 500 cc Fresh H$_2$O (g) | 400 cc 15% HCl (g) | 500 cc Fresh H$_2$O (g) | Fines Produced Total (g) |
|---|---|---|---|---|---|---|
| 7. | (0.23) none | Calcite | 0.42 | — | — | 0.42 |
| 8. | PMTHHDT (0.45) | Calcite | 0.35 | — | — | 0.35 |

From Table II, it can be seen that PMTHHDT is effective in reducing the migration of silica, hematite and calcite fine particles.

EXAMPLE II

Tests were performed to determine the effectiveness of the organic polycationic polymers of the present invention as swelling clay stabilizers. The polymer used to carry out these tests comprised poly(methacrylamido-4,7,11-triaza-4,4,7,7,11,11-hexamethyl-9-hydroxydodecamethylene trichloride) (PMTHHDT). The PMTHHDT had a weight average molecular weight of about 135,000.

The equipment used to carry out the tests was the same test equipment as described in Example I.

The TEFLON sleeved test chambers were packed (from bottom to top) with 10 g of Oklahoma No. 1 sand (70–170 U.S. mesh); 60 g of a mixture of 85.0% Oklahoma No. 1 sand (70–170 U.S. mesh), 10.0% silica, (ca. 270 U.S. mesh), and 5.0% Wyoming bentonite; 10 g Oklahoma sand No. 1 sand (70–170 U.S. mesh); and 25 g 20–40 U.S. mesh sand. Fluids were forced through the chambers at 145° F. using an applied pressure of 50 psig.

A standard laboratory brine was prepared by mixing 7.5 weight percent sodium chloride, 0.55 weight percent calcium chloride, 0.42 weight percent magnesium chloride hexahydrate, and 91.53 weight percent fresh water. The brine was injected through each test chamber until a stable flow rate was achieved. This initial brine flow rate was defined as 100.0%. Each chamber was then treated with either 100 cc or 200 cc of treatment fluid. The fluid comprised 2.0 percent by weight ammonium chloride. Tests 2 and 3 contained, in addition to the ammonium chloride, 0.43% by weight PMTHHDT. Optionally, about 750 cc of standard laboratory brine was then injected through the chambers. After the injection of the brine, from about 100 cc to about 700 cc of deionized water was injected through the chambers. In test 3, about 300 cc of an aqueous 15 percent by weight hydrochloric acid solution was injected into the test chambers followed by 400 cc of deionized water. The results of these tests are shown in Table III.

rates declined to a greater degree than tests which utilized PMTHHDT in the treatment fluid, as shown in Tests 2 and 3. In addition, the post-treatment flow rates of Test 3 remained satisfactory even after the injection of an aqueous solution containing about 15 percent by weight hydrochloric acid.

The invention is not limited to the above-described specific embodiments thereof; it must be understood therefore that the detail involved in the descriptions of these embodiments is presented for the purposes of illustration only, and that reasonable variations and modifications, which will be apparent to those skilled in the art, can be made of this invention without departing from the spirit and scope thereof.

What is claimed is:

1. A method of preventing or reducing the migration of fines or the swelling of clays or combinations thereof in a permeable subterranean formation comprising: contacting said fines or swelling clays or combinations thereof with an effective amount of an organic polycationic polymer having a molecular weight in the range of from about 50,000 to about 300,000 and having monomer units of the formula:

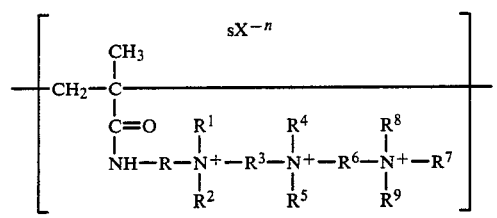

wherein
R and R$^3$ are independently an alkylene group having from about 2 to about 4 carbon atoms;
R$^1$, R$^2$, R$^4$, R$^5$, R$^7$, R$^8$, and R$^9$ are independently selected from the group consisting of methyl and ethyl;
R$^6$ is selected from the group consisting of an unsubstituted alkylene group having from about 2 to about 4 carbon atoms and a substituted alkylene

TABLE III

| Test No. | Treatment$^a$ Fluid | Initial Brine Flow Rate (cc/min) | Treatment Fluid Volume (cc) | Post-Treatment Flow Rate (% of Initial Brine) | | | | | | | | |
|---|---|---|---|---|---|---|---|---|---|---|---|---|
| | | | | Brine | Deionized Water$^b$ | | | | 15% HCl | Deionized Water | | |
| | | | | | 100 cc | 250 cc | 400 cc | 700 cc | | 100 cc | 200 cc | 400 cc |
| 1. | 2% NH$_4$Cl | 18.0 | 200 | * | 1% | * | * | * | * | * | * | * |
| 2. | 0.43% PMTHHDT/ 2% NH$_4$Cl | 18.2 | 100 | 110.4 | 45.6 | 28.1 | 24.0 | * | * | * | * | * |
| 3. | 0.43% PMTHHDT/ 2% NH$_4$Cl | 11.7 | 200 | * | 123.8 | 115.2 | 110.8 | 100.9 | 94.9 | 103.0 | 91.4 | 78.2 |

$^a$Percent by weight of each ingredient given.
$^b$The flow rate was determined when the cumulative fresh water injection volume in this step reached the indicated value.
*Fluid not injected.

The results of these tests show that when PMTHHDT was not utilized in the treatment fluid, as shown in Test 1, the post-treatment fresh water flow group having from about 2 to about 4 carbon atoms and containing a hydroxy group;

X is an anion selected from the group consisting of a halogen, methyl sulfate, sulfate, and nitrate;

n represents the valency of the anion represented by X; and, a is an integer equal to the number of said anions required to maintain electronic neutrality.

2. The method recited in claim 1 wherein $R^1$, $R^2$, $R^7$, $R^8$, and $R^9$ are methyl.

3. The method recited in claim 2 wherein R and $R^3$ are independently selected from the group consisting of ethylene, trimethylene, tetramethylene, and 2-methyltrimethylene.

4. The method recited in claim 3 wherein $R^6$ is selected from the group consisting of 2-hydroxytrimethylene, 2-hydroxytetramethylene and 3-hydroxytetramethylene.

5. The method recited in claim 4 wherein X is selected from the group consisting of chloride, bromide, iodide, sulfate and methyl sulfate.

6. The method recited in claim 5 wherein said organic polycationic polymer has a weight average molecular weight of about 135,000.

7. The method recited in claim 7 wherein said polymer is dispersed in a carrier fluid.

8. The method recited in claim 7 wherein said carrier fluid comprises from about 0.1 to about 40.0 percent by weight of a salt and said salt is selected from the group consisting of an alkali metal halide, an alkaline earth metal halide, an ammonium halide, and mixtures thereof.

9. The method recited in claim 8 wherein said polymer is present in said carrier fluid in the range of from about 0.01 to about 5.0 percent by weight of the carrier fluid.

10. The method recited in claim 9 wherein said carrier fluid further comprises a mineral acid selected from the group consisting of about 15 percent by weight hydrochloric acid, and a mixture of about 12 percent by weight hydrochloric acid and about 3 percent by weight hydrofluoric acid.

11. The method recited in claim 1 wherein said method is used in conjunction with a secondary recovery operation.

12. The method recited in claim 1 wherein $R^1$, $R^2$, $R^7$, $R^8$, and $R^9$ are methyl, R is ethylene, $R^4$ and $R^5$ are ethyl, $R^6$ is 2-hydroxytrimethylene, and X is chloride.

13. The method recited in claim 12 wherein said fines are selected from the group consisting of silica, iron minerals, alkaline earth metal carbonates and mixtures thereof.

14. The method recited in claim 1 wherein said polymer further comprises a monomer unit selected from the group consisting of dimethylaminoethyl methacrylate, the alkyl chloride salt of dimethylaminoethyl methacrylate, N,N-dimethylacrylamide, N-Hydroxymethylacrylamide, diethylaminomethyl methacrylate, N,N-dimethylaminopropyl methacrylamide, and mixtures thereof said monomer unit being present in an amount up to 30 percent by weight of the polymer.

15. A method of treating a earthen formation comprising migrating fines or swelling clays or combinations thereof to reduce loss of permeability in said formation because of the migration of said fines or the swelling of said clays or combinations thereof comprising: contacting said fines or swelling clays or combinations thereof with an effective amount of an organic polycationic polymer having a molecular weight in the range of from about 50,000 to about 300,000 and having monomer units of the formula:

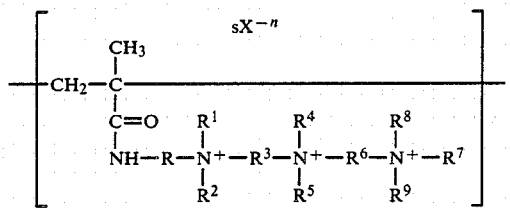

wherein

R and $R^3$ are independently an alkylene group having from about 2 to about 4 carbon atoms;

$R^1$, $R^2$, $R^4$, $R^5$, $R^7$, $R^8$, and $R^9$ are independently selected from the group consisting of methyl and ethyl;

$R^6$ is selected from the group consisting of an unsubstituted alkylene group having from about 2 to about 4 carbon atoms and a substituted alkylene group having from about 2 to about 4 carbon atoms and containing a hydroxy group;

X is an anion selected from the group consisting of a halogen, methyl sulfate, sulfate, and nitrate;

n represents the valency of the anion represented by X; and, s is an integer equal to the number of said anions required to maintain electronic neutrality.

16. The method recited in claim 16 wherein said fines are selected from the group consisting of silica, iron minerals, alkaline earth metal carbonates and mixtures thereof.

17. The method recited in claim 16 wherein said polymer is dispersed in a carrier fluid and the carrier fluid comprises from about 0.1 to about 40.0 percent by weight of a salt and said salt is selected from the group consisting of an alkali metal halide, an alkaline earth metal halide, an ammonium halide, and mixtures thereof.

18. The method recited in claim 17 wherein $R^1$, $R^2$, $R^7$, $R^8$ and $R^9$ are methyl, $R^4$ and $R^5$ are ethyl, R and $R^3$ are independently selected from the group consisting of ethylene, trimethylene, and tetramethylene, and $R^6$ is selected from the group consisting of 2-hydroxytrimethylene, 2-hydroxytetramethylene, and 3-hydroxytetramethylene.

19. The method recited in claim 18 wherein said carrier fluid further comprises a mineral acid selected from the group consisting of about 15 percent by weight hydrochloric acid and a mixture of about 12 percent by weight hydrochloric acid and about 3 percent by weight hydrofluoric acid.

* * * * *

UNITED STATES PATENT AND TRADEMARK OFFICE
CERTIFICATE OF CORRECTION

PATENT NO. : 4,536,305
DATED : August 20, 1985
INVENTOR(S) : John K. Borchardt and Bill M. Young It is certified that error appears in the above-identified patent and that said Letters Patent is hereby corrected as shown below:

Column 6, at line 63 and 64, delete the word "concentrations" and insert therefore --concentration--.

Column 11, at line 7, delete the letter "a" and insert therefore --s--.

Column 12, at line 1, delete the word "a" and insert therefore --an--.

Column 12, at line 39, delete the number "16" and insert therefore --15--.

Signed and Sealed this

Eleventh Day of February 1986

[SEAL]

Attest:

DONALD J. QUIGG

Attesting Officer

Commissioner of Patents and Trademarks